BINARY DECODER

Filed July 30, 1956 4 Sheets-Sheet 1

INVENTOR
J. R. WOODBURY
BY [signature]
ATTORNEY

INVENTOR
J. R. WOODBURY
BY [signature]
ATTORNEY

Nov. 26, 1957 J. R. WOODBURY 2,814,437

BINARY DECODER

Filed July 30, 1956 4 Sheets-Sheet 3

INVENTOR
J. R. WOODBURY

BY [signature]

ATTORNEY

INVENTOR
J. R. WOODBURY
BY [signature]
ATTORNEY 2,814,437

BINARY DECODER

James R. Woodbury, Newark, N. J., assignor to Bell Telephone Laboratories, Incorporated, New York, N. Y., a corporation of New York Application July 30, 1956, Serial No. 600,857

17 Claims. (Cl. 235—61)

Figure 1:
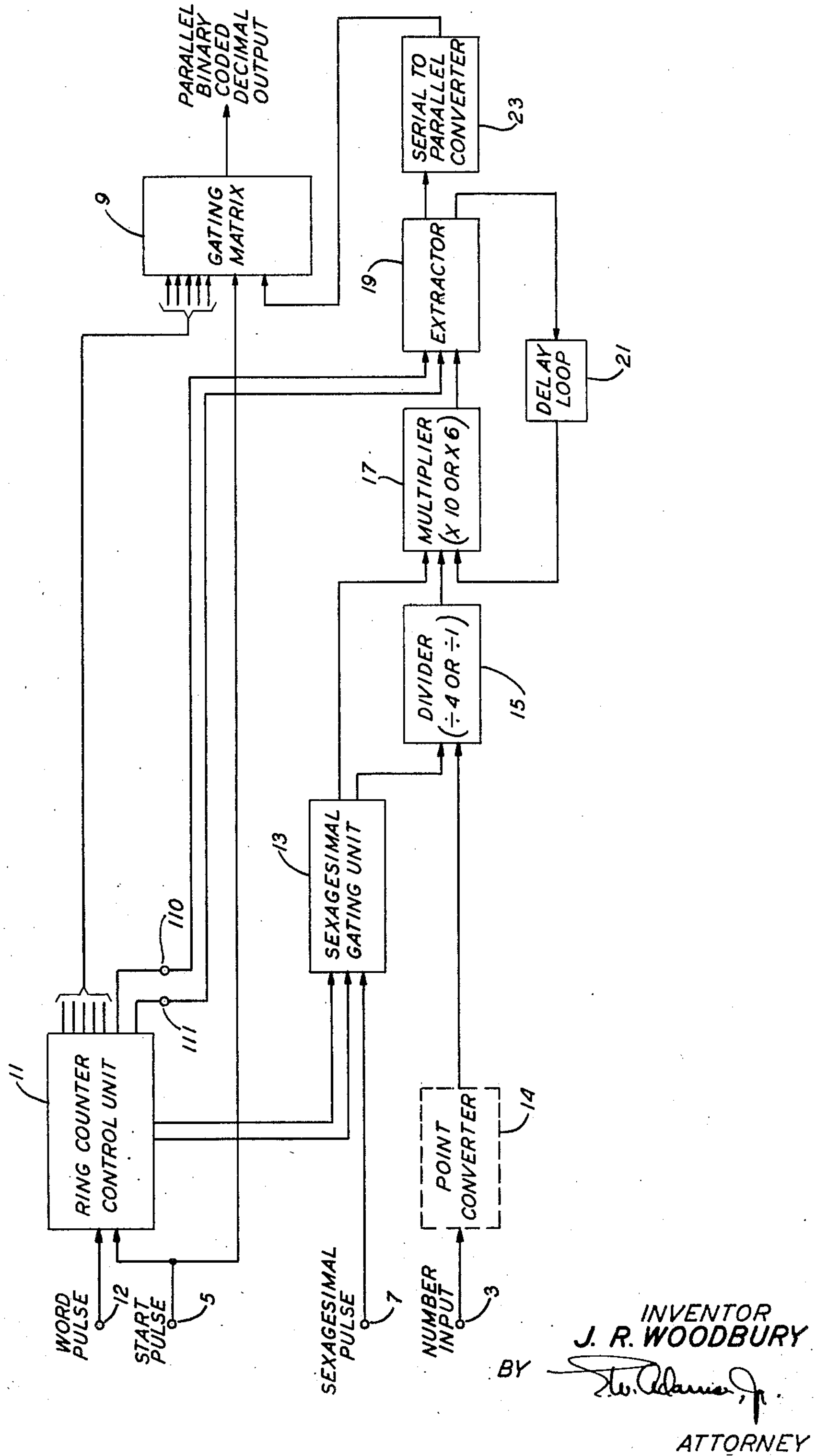

This invention pertains to apparatus for translation between different arithmetic codes, and especially to code translators suitable for the translation of quantities expressed in a binary code to their decimal or sexagesimal equivalents.

Because of the economy and circuit simplicity of digital computing equipment which operates in accordance with the binary number system, this type of arithmetic code is widely utilized in such devices. However, the results of all computations are then produced in binary form, and to render them more readily usable by personnel unfamiliar with the binary number system it is necessary to translate them to their decimal equivalents. Such translation is itself an arithmetic operation which a computer can be programmed to do, but the time which this requires would greatly reduce the rate at which the computer could accept new input data. It is therefore preferable to provide a translator as a separate output unit for carrying out the desired translation of each output number produced by the computer while the latter is left free to proceed with calculation of new output numbers corresponding to new input data.

Binary to decimal translators are known which store the decimal equivalents of all binary numbers which might be required to be translated. In simplest form the storage mechanism may be the fixed wiring of a logic matrix array, but even then such arrangements are impracticable when many thousands of different binary numbers may have to be translated. Another type of translator utilizes resistive elements connected in parallel and having relative resistance values which are weighted in proportion to the decimal values of successive digits in the binary number code. The net current through the parallel combination is then proportional to the decimal value of an applied binary number, the digits of which control switches which can either send a constant current or no current through each element. The difficulty with such a circuit is that changes in the resistance values with temperature and with aging make it difficult to adjust the translator so the output current will be zero when the input number is zero.

To overcome the foregoing disadvantages, translators have been developed which are actually small digital computing units. That is, they perform arithmetic operations corresponding to the relationship between binary and decimal numbers. An instance of this is a translator wherein the input binary number is first divided by the binary equivalent of the largest decimal power which produces a quotient greater than unity. The integral part of the quotient is then the binary equivalent of the most significant decimal digit in the decimal value of the number. This is stored, and the remaining part of the quotient is divided by the binary equivalent of the next smaller decimal power of ten. The integral part of this second quotient is then the binary equivalent of the next most significant decimal digit in the decimal value of the number. The procedure is repeated until a quotient having a decimal value less than ten results, which will be the units digit in the decimal value. The individual binary code groups corresponding to each of the decimal digits are called the "binary-coded-decimal" equivalents of the number, and can be readily utilized in known manner to provide a visual display of the decimal value of the number. Since the integral part of the quotient of a division operation is mathematically the same as the quantity obtained by repeated subtraction of the divisor from the dividend until a remainder less than the dividend is produced, translators of the foregoing type can be readily adapted to utilize repetitive subtraction rather than repetitive division operations. This type of translation is known in the art as "subtraction-to-zero."

Both the dividing and subtracting versions of such translators involve large amounts of relatively complicated equipment. In the subtracting arrangement it is necessary to ascertain when a particular subtraction produces a result smaller than the subtrahend. This necessitates circuitry which is sensitive to the production of negative differences, and further circuitry to add the subtrahend back to that difference and change to the next smaller subtrahend. In the dividing arrangement, if a given divisor is greater than the dividend it is necessary to recognize that no integral part is present in the quotient, and to retain the original dividend for division by the next smaller divisor. In both arrangements the operation requires a change of subtrahend or divisor, as the case may be, for deriving each successive decimal digit.

A further problem encountered in utilizing conventional decoders to translate binary numbers is encountered when the binary number may represent values in other than the decimal number system. An important instance of this is the case of sexagesimal numbers, which express the number of degrees and minutes of an angular quantity. While decimal digits are used to express the amount of each of these units of measurements, since the two units are related by a factor of sixty rather than ten it has heretofore been necessary to provide completely separate translating equipment to decode sexagesimal numbers.

An object of the instant invention is to provide simplified means for translating quantities expressed in a first number code to their values in a second number code.

A further object is to accomplish translation of binary numbers to their decimal values by a series of cyclically repeated operations which are arithmetically the same in all respects in each operating cycle involving the same units.

A further object is to provide means adapted to translate both binary numbers which correspond to values in a first number code and binary numbers which correspond to values in a second number code.

In one embodiment, a translator in accordance with the instant invention comprises multiplying means for receiving successive binary numbers which have been put in a form such that the largest of them is less than one and greater than one-tenth. The multiplying means performs a multiplication of each such number by ten in binary form. The four most significant binary digits, or "bits," of the product then constitute the binary equivalent of the most significant decimal digit in the decimal value of the number. The multiplying means is connected to extracting means which sends all bits of the product except the four most significant into a recirculatory loop through which they are returned to the multiplying means after a suitable time delay. The four most significant bits, however, are directed into a serial to parallel converter which directs them to four separate leads respectively connected to memory units. These units are thereby set to states corresponding to the binary equivalent of the most significant decimal digit. By the time this has occurred the bits in the recirculatory loop begin re-entering the multiplying means, which again multiplies them by ten in binary form. The entire operation then repeats as in the first cycle, but the four most significant bits now extracted represent the binary equivalent of the next most significant decimal digit in the decimal value of the number being translated. They are directed to another group of four memory units to set them in states representing the values of those bits. By repetition of these operations the required decimal value can be derived to any desired degree of accuracy. A subsequent binary number may then be admitted to the multiplying means for translation.

In a modification of the foregoing arrangement the multiplying means may be adapted to multiply an incoming number by other quantities than ten, again in binary form. For example, for translating to sexagesimal rather than decimal values, means are provided which causes the multiplying means to use a multiplier of six rather than ten in the fourth cycle of multiplication.

Figure 2:
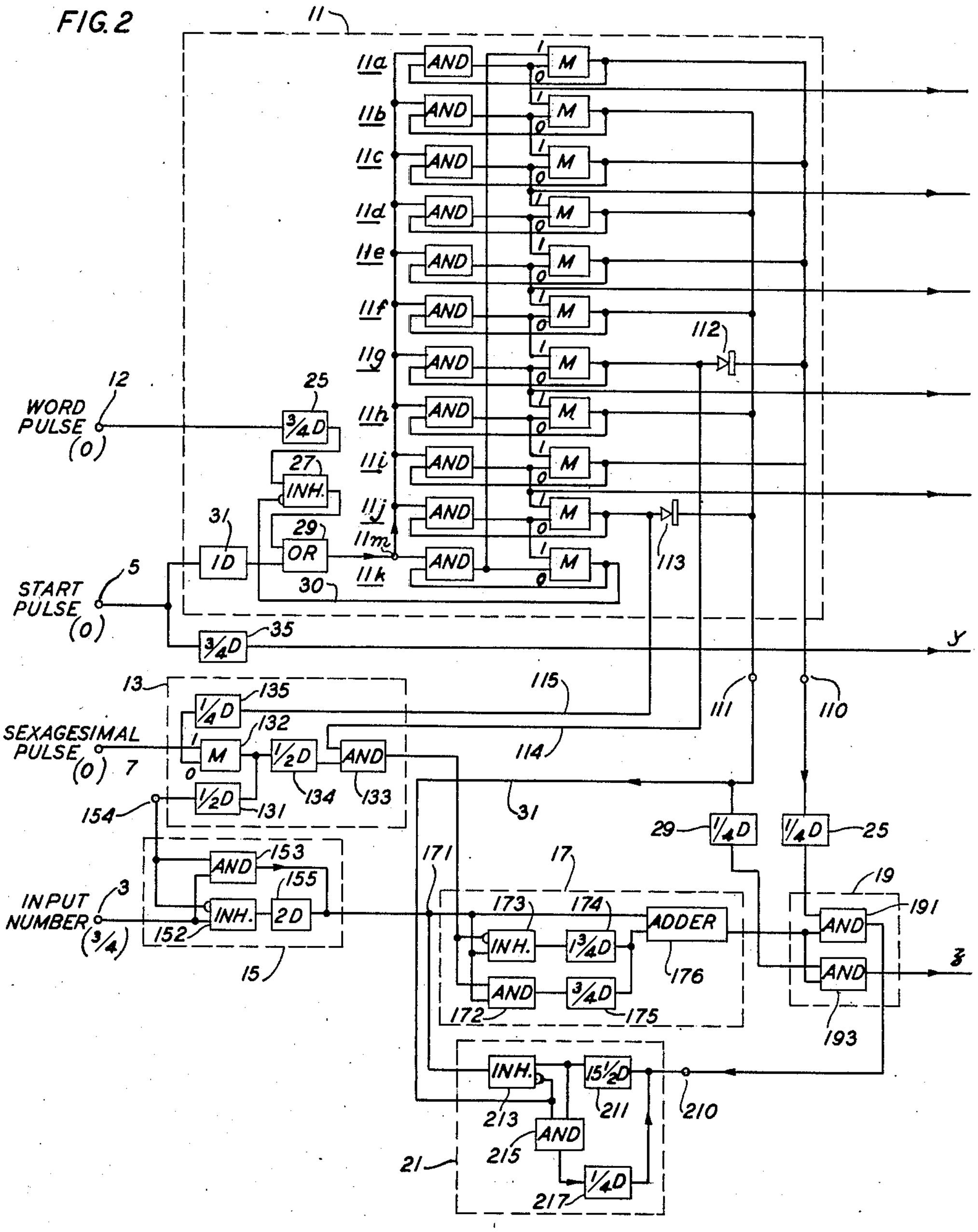
Figure 2A:
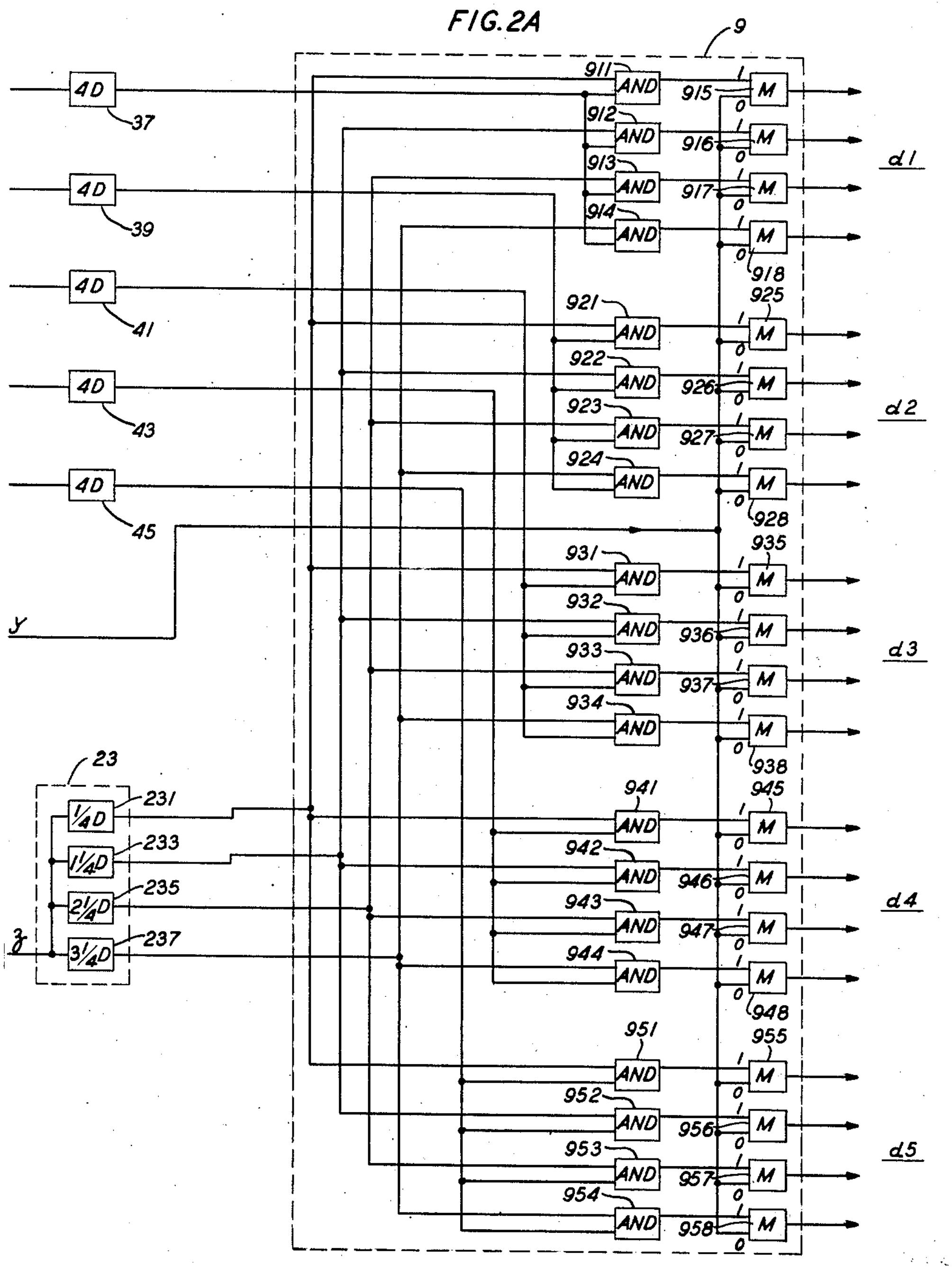
Figure 3:
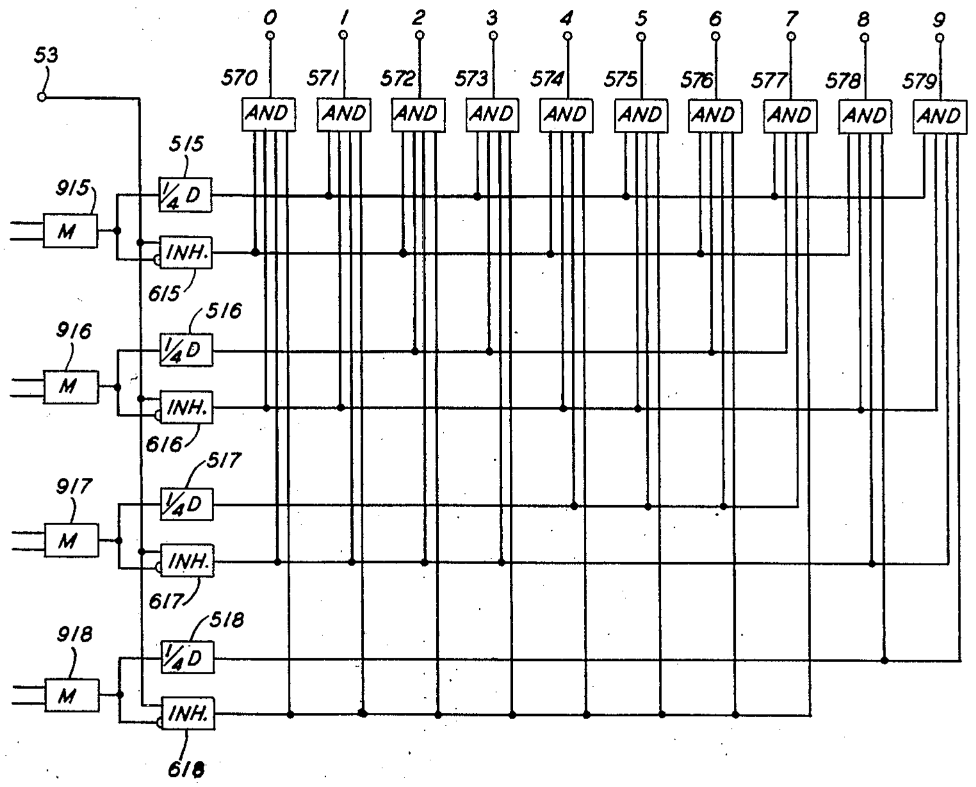

Other objects and features of the invention will be apparent from the following specification and accompanying drawings, in which:

Fig. 1 is a block diagram illustrating the functional relationships between the major units of a translator constructed in accordance with the principles of the invention;

Figs. 2 and 2A together comprise a detailed logic circuit diagram of a translator constructed in accordance with the foregoing principles, and are to be read with Fig. 2A positioned to the right of Fig. 2; and Fig. 3 is a logic circuit diagram of means whereby binary coded decimal numbers may be utilized to produce a true decimal display.

A translator constructed in accordance with the invention operates in accordance with an arithmetic algorithm, or operating rule, which is based on the fact that the integral and fractional parts of all numbers remain separated by a "point" in all number systems. In the decimal number system this is the "decimal point"; in the binary number system it is the "binary point," etc. As a result, the integral and fractional parts of a number in one arithmetic code are separately equivalent to the integral and fractional parts of the same number in any other arithmetic code. If a decimal number is put in a form wherein only one digit lies to a given side of the decimal point, the bits of the equivalent binary number which lie on the corresponding side of the binary point will be the binary equivalent of that decimal digit.

The translator is adapted to receive binary numbers which are all in the form of absolute magnitudes. That is, negative numbers are to be expressed as their true binary magnitudes rather than in complement form. In addition, prior to the translation operation the binary point of all input binary numbers is established so that all are treated either as fractional quantities or all as integral quantities. In the fractional case the binary point is placed so that the largest binary number to be translated has a decimal value less than one and greater than one-tenth. Every input number then lies entirely to the right of the binary point. In the integral case the binary point is placed so that the smallest binary number to be translated has a decimal value of at least one but less than ten. Every input number then lies entirely to the left of the binary point.

If the translator is designed to accept fractional numbers it can be directly connected to a "fractional" binary computer wherein all quantities are treated as if the largest of them is just less than "one." Similarly, a translator for integral numbers can be directly connected to an "integral" binary computer wherein all quantities are treated as if the smallest is at least equal to "one." However, a translator of either type may be utilized with a computer of the opposite kind, or even with a "floating point" computer, wherein all numbers are treated as their actual magnitudes. In such cases apparatus is required to place all output numbers from the computer into the form which the translator is designed to accept. To go from an integral computer to a fractional translator, numbers from the computer must be divided by the binary equivalent of a power of ten one greater than that of the largest such power in the decimal value of the largest output number to be translated. For example, suppose an integral computer has a capacity of five significant bits, so that the largest binary number it can hold is 11111, equivalent to the decimal value 31. The highest power of ten in this number is "one." If numbers from such a computer are to be applied to a "fractional" translator, they must be divided by the binary equivalent of ten raised to the second power, or one hundred. The same bits in a "floating point" computer having the same capacity might be in the form 111.11, equivalent to the decimal value 7.75. Then division by the binary equivalent of ten would be required. While the operation is referred to as "division," it is apparent that multiplication by the reciprocal of the required divisor would yield the same result. Consequently, the term "point conversion" will be used to identify either such operation for placing numbers to be translated in the proper range of magnitudes.

In most cases where numbers applied to the translator must be first converted to the proper range of magnitudes, the computer itself can be easily programmed to perform that operation. Virtually all computers utilize various scale factors in their normal arithmetic operations, in order to assure that the result of any computation will not exceed the computer capacity. As a result, provision must be made in any case to compensate for these scale factors before delivering output numbers to other equipment. For example, if all input numbers are divided by a factor F at the input to the computer, they must be multiplied by F at the output. For delivery to a fractional type translator, the total correcting factor could then be F divided by the proper power of ten, or $$\frac{F}{100}$$

in the first example above. Consequently inclusion of this further scale factor does not involve any additional operations beyond those normally involved in a digital computer.

In those cases where a computer treats negative numbers as complements, these must be complemented to obtain true absolute magnitudes before applying them to the invention for translation. Again, since most computers normally perform this operation in all cases, this requirement is not actually an additional burden. In any case, the complementing operation can be carried out by very simple circuitry included between the computer and translator. One such circuit is described on pages 54 and 55 of the text "Faster Than Thought," edited by B. V. Bowden, Sir Isaac Pitman and Sons, Ltd., 1953.

For a fractional type translator the arithmetic algorithm utilized by the invention calls for multiplication of each number by the binary equivalent of the decimal value ten, and extraction of the four bits lying to the left of the binary point of the resulting product. These will constitute the binary equivalent of the most significant decimal digit in the decimal value of the number. The bits remaining to the right of the binary point are subjected to the same process, and the bits then extracted are the binary equivalent of the next most significant decimal digit. The process is repeated cyclically a number of times equal to the number of significant decimal digits to be retained. To illustrate, suppose the incoming number is 0.10111, having the decimal value 0.71875. The cyclic operations are then as shown in Table 1:

*Table 1*

| Cycle | Operation | Product | Bits Extracted | Decimal Equivalent |
|---|---|---|---|---|
| 1 | 0.10111×1010 | 0111.00110 | 0111 | 7 |
| 2 | 0.00110×1010 | 0001.11100 | 0001 | 1 |
| 3 | 0.11100×1010 | 1000.11000 | 1000 | 8 |
| 4 | 0.11000×1010 | 0111.10000 | 0111 | 7 |
| 5 | 0.10000×1010 | 0101.00000 | 0101 | 5 |

The location of the decimal point is determined by the decimal value of the maximum number the computer may be required to handle. If this is 1000, the result will be read as 718.75; if it is 100, it will be read as 71.875 etc.

For an integral type translator, the corresponding arithmetic algorithm utilized by the invention requires successive division of each number by the binary equivalent of the decimal value ten and extraction of the bits produced to the right of the binary point after each such division. In such a system the first group of extracted bits represent the least significant decimal digit, and successive groups the ensuing decimal digits up to the most significant.

One disadvantage of the integral type translator stems from the fact that the most significant bits in the number to be translated are the last to be extracted. Any slight errors in each cyclic operation of the translator are therefore magnified most in the most important translated digit. On the other hand, in a fractional type translator, as described, the most significant demical digits are extracted first and so suffer least from such cumulative errors. Another disadvantage of integral translation is that a division of most binary numbers by the binary equivalent of ten does not produce remainders having the same number of places, nor even in all cases remainders which can be exactly expressed in any number of places. While four bits of any such remainder will, in fact, suffice to distinguish the decimal digit they represent, those bits will not be the equivalent of that digit in binary coded decimal form.

To illustrate, suppose that the number 10101, having the decimal value 21, is to be translated. The integral translation process requires, first, division by the binary number 1010 and extraction of the non-integral part of the quotient. The division operation in decimal form yields 2.1. In binary form, however, there is no exact representation for this quantity, the result being 10.00011001100 - - -. The bits to the right of the binary point are not the binary coded equivalent of the decimal value "one." They may be so interpreted, however, by restricting consideration to only the four most significant, or 0001. If this is done for each of the decimal digits "one" to "nine," each will be found to correspond to a particular combination of bits and so can be identified. However, except for the decimal digit "one" these combinations are not the binary equivalents of the decimal digits they represent. Thus, the digit 2 will be represented as 0011, 3 as 0100, and remaining digits by other unconventional combinations of bits. While this may not be objectionable where a direct visual indication of decimal values is desired, since a simple logic matrix may easily be designed to handle arbitrary combinations of bits, it may necessitate auxiliary equipment when true binary coded representations of the various decimal digits are required.

For the foregoing reasons, the preferred embodiment of the invention is concerned with the fractional type of translation described above, and the embodiment described in detail hereinafter is designed to accept fractional numbers.

When an incoming binary number represents a sexagesimal value, a pulse designated herein as the "sexagesimal pulse" is supplied to the translator by the computer. This changes the multiplier from ten to six during the cycle of operation of the translator immediately following the cycle during which the binary equivalent of the last decimal digit in the number of degrees is extracted. After one cycle of multiplication by six the translator again returns to a multiplier of ten. For example, suppose the incoming number is 0.00101, but represents a sexagesimal rather than a decimal value. The cyclic translation operation is then as shown in Table 2:

*Table 2*

| Cycle | Operation | Product | Bits Extracted | Decimal Equivalent |
|---|---|---|---|---|
| 1 | 0.00101×1010 | 0001.10010 | 0001 | 1 |
| 2 | 0.10010×1010 | 0101.10100 | 0101 | 5 |
| 3 | 0.10100×1010 | 0110.01000 | 0110 | 6 |
| 4 | 0.01000×0110 | 0001.10000 | 0001 | 1 |
| 5 | 0.10000×1010 | 0001.00000 | 0101 | 5 |

Since the number of degrees in any angle may be in the hundreds, and the number of minutes in the tens, the result is read as 156°15'. To prove the correctness of this result, note that in decimal form it is 156.25°. Applying a divisor of one-thousandth to place this magnitude between one and one-tenth, as required for translation, yields 0.15625. This is the same as the decimal value of the original binary number, 0.00101. Note that in the fourth cycle of the translation process a binary multiplier having the decimal value six, rather than ten, was used.

The foregoing procedure is not limited to translation to only decimal or sexagesimal values. In the general case, quantities comprising the same number of digits in any number system A may be translated to their values in a second number system B by first converting all of them to a range of magnitudes either less than or greater than unity. In the first ("fractional") case, repeated multiplication of each converted quantity by the equivalent in code A of a power of the radix of code B, with extraction of the successive groups of digits lying in denominational positions corresponding to successive integral power of that radix, will provide the equivalent in code A of each digit of the translated value in code B. The second ("integral") case is similar, except that successive multiplication by the equivalent in code A of the reciprocal of a power of the radix of code B, or equivalently, a negative power, is required. The "radix" is the number base of any number system, being "10" in the decimal system, "2" in the binary system, etc.

A generalized process may also be stated for translation of fractional quantities in any number system A to their values in mixed units in another number system B, wherein each digit of any number in system B is related to the preceding digit by an arbitrary multiple. The translation is carried out similarly to the case where only a single unit is utilized, except that successive multiplication by the equivalent in system A of the successive multiples relating successive digits in system B is required. For example, suppose that a binary number to be translated represents 6 gallons, 3 quartes, 1.6 pints. These are mixed units in the decimal number system, and may be expressed wholly in gallons as 6.95. The translation then requires conversion of 6.95 to 0.695, followed by the cyclic operations shown in Table 3:

*Table 3*

| Cycle | Operation | Product | Digit Extracted |
|---|---|---|---|
| 1 | 0.695×10 | 6.95 | 6 |
| 2 | 0.95×4 | 3.80 | 3 |
| 3 | 0.80×2 | 1.60 | 1 |
| 4 | 0.60×10 | 6.00 | 6 |

Although the operations in Table 2 have been stated in decimal form for ease of interpretation, the process would, of course, be carried out in binary form in the translator. The multiplier in the second step was "4" because the decimal digit extracted in that step is related to the preceding extracted digit by the multiple four quarters per gallon. Similarly, in the third step the multiplier was "2" because the digit extracted is related to the one extracted in the preceding step by the multiple two pints per quart. In the last step the digit extracted is related to the one extracted in the preceding step by the multiple "10," so that multiplier was used. This is also true in extracting the first translated digit when, as here, the initial quantity to be translated is expressed in terms of the largest of the mixed units.

In the event the quantity to be translated is expressed in a unit which is not the largest of the mixed units in the translated value, in extracting the first digit the multiplier which must be used is the radix of the translated value divided by the multiple relating the units involved. Thus, in translating 162 quarts to gallons, after expressing the initial number as 0.162 it must be multiplied by $$\frac{10}{4}$$

All subsequent digits then only require successive multiplication by ten.

A particular embodiment of a translator constructed in accordance with the invention will now be described with reference to translation of quantities supplied from a binary digital computer wherein they are expressed as binary numbers comprising fifteen significant bits plus a sixteenth "sign" bit. This translator is, however, adapted to receive binary numbers comprising any number of significant bits up to and including seventeen. In accordance with the mode of operation of most binary computers, the sign bit is "0" for positive numbers and "1" for negative numbers. Since all numbers fed to the translator are first placed in absolute form, as stated above, the "sign" is positive in all cases and the sign bit is always zero. Consequently, the translator actually receives fifteeen significant bits and derives the equivalent decimal value without directly indicating its sign. If an indication of the actual sign of a number is desired, it is a simple matter to arrange so that the computer feeding the translator, or the former's complementing circuit, provides a pulse to operate an indicating lamp device such as a lamp whenever the number being supplied to the translator is negative. Such arrangements will be readily apparent to those skilled in the computer arts.

The binary values of successive bits in a number are usually represented by distinct levels of potentials of successive pulses occurring at uniformly spaced intervals. The most common arrangement is for each bit to be represented by a positive pulse if it is a "1" and by the absence of a pulse if it is a "0." The timing of all bits may be established by a source of accurate timing pulses denoted the "word pulse generator." This constitutes part of virtually all synchronous computers, and may comprise two ring counters so connected that for every group of sixteen equally spaced pulses produced by the first counter the second produces a single pulse. The time of occurrence of the first pulse in each group produced by the first counter is called digit time zero T(0), the time of the second pulse is digit time one T(1) etc. The sixteenth pulse defines digit time fifteen T(15). Consequently, the second counter produces a series of pulses each of which occurs at T(0) and separated by sixteen digit times. This series is called "word pulse zero." The bits in any number produced by the computer occur in successive digit times, this being achieved by use of the word pulse generator to control the relative times of occurrence of pulses anywhere in the computer.

Digit times in excess of fifteen may be considered to occur relative to an arbitrary time reference. Thus, if a particular bit enters the translator at T(14) and is delayed six digit times before reaching another part of the translator circuit the situation can be described by saying that it reaches that position at T(20). The time reference here is the instant the bit entered the translator, and may be a useful concept in visualizing the time relations between events occurring at different parts of the circuit. However, in relation to the timing pulses produced by the word pulse generator, a stated digit time in excess of 15 is the same as that digit time less the largest integral multiple of sixteen digit times it contains. Consequently, a pulse occurring at T(20) is simultaneous with a pulse occurring at T(4) in the cycle of the word pulse generator immediately following the cycle relative to which the time of the first pulse is defined. Similarly, a pulse at T(52) is simultaneous with a pulse at $T(52)-T(3\times16)=T(4)$ in the third succeeding word pulse cycle relative to that to which the time of the first pulse is defined.

In most digital computers the least significant bit of a number is produced first, followed sequentially by the others in ascending order of significance. This is the system assumed to be used by the digital computer which supplies numbers to the translator of the instant invention. Since fifteen significant bits are provided, a maximum of five decimal places is required to express the equivalent decimal value. Accordingly, the translator is adapted to display a maximum of five decimal digits.

In the block diagram of the translator shown in Fig. 1, the four input terminals at the left represents inputs from a digital computer (not shown) which supplies input numbers to the translator. When the computer is ready to provide an input number to terminal 3 for translation to decimal form, it first supplies a single "start" pulse to terminal 5. In the event the number to be translated represents a sexagesimal value, the computer also supplies a single "sexagesimal" pulse to terminal 7 simultaneously with the start pulse. This actuates a sexagesimal gating unit 13 connected to that terminal. The start pulse is applied to a gating matrix 9 comprising a group of four gating circuits for each decimal digit, there being five such groups in all. Each gating circuit produces a train of pulses when actuated, the start pulse serving to initially turn all gating circuits "off." The start pulse is also applied to a ring counter control unit 11, which provides accurately timed control pulses to all other units in the complete circuit. Control unit 11 is under the master control of word pulses supplied to it at terminal 12 from the computer. The word pulses cause the control unit to produce a single gating pulse at equal intervals at five output leads respectively connected to the five groups of gating units in gating matrix 9. Control unit 11 also has a pair of output terminals 110 and 111 at which trains of equal numbers of pulses are alternately produced at equal intervals in response to successive word pulses.

If the computer supplies input numbers at terminal 3 in the correct range of magnitudes, i. e., such that the largest number has a decimal value greater than one-tenth but less than one, they may be directly applied to a divider 15. If this is not the case, they are first applied to a "point converter" 14 which may be either a divider or a multiplier as described above. Since point converter 14 is not required in all cases, it is shown dotted in Fig. 1.

Divider 15 normally divides an incoming number by the binary equivalent of four. However, if a sexagesimal pulse has occurred at terminal 7, thereby actuating sexagesimal gating unit 13, the latter causes divider 15 to pass the incoming number without undergoing division. The presence of divider 15 increases the accuracy of translation to sexagesimal values by permitting the computer feeding the translator to retain significant bits which would otherwise be discarded, as will be explained in more detail hereinafter.

The number at the output of divider 15 is applied to multiplier 17, which normally multiplies it by the binary equivalent of ten. The product produced by the latter unit is applied to an extractor 19 which is gated by pulses from terminal 110 of control unit 11 to pass the bits of the product to a delay loop 21. On emerging from the delay loop the bits are recirculated to multiplier 17. However, extractor 19 is also gated by pulses from terminal 111 of control unit 11 so that just as the most significant four bits of the product produced by multiplier 17 reach the extractor they are passed on to a serial-to-parallel converter 23 instead of to delay loop 21. Serial-to-parallel converter 23 comprises four paths of which the second has one digit time more delay than the first, the third has one digit time more delay than the second, and the fourth has one digit time more delay than the third. These paths are respectively connected to the four gating circuits for each decimal digit in matrix 9. The four extracted bits, prior to entering serial-to-parallel converter 23, were separated by one digit time from each other, as in the case of any number. On being applied in succession to the four delay paths described, the first bit emerges from the fourth path after three digit times of delay, the second bit emerges from the third path after two digit times of delay, the third bit from the second path after one digit time delay, and the fourth bit from the first path without delay. Consequently, these bits all are simultaneously present at the outputs of serial-to-parallel converter 23 at a particular digit time, and at that time a single gating pulse from the first output lead of control unit 11 actuates the first group of gating circuits in matrix 9. Consequently, if the extracted bit applied to any gating circuit in matrix 9 was a "1," that circuit will be set to produce a train of pulses. The states of the gating circuits will thereby represent the most significant decimal digit of the input word in binary coded decimal form.

While this occurs, the bits of the product applied to delay loop 21 proceed through that unit, emerge, and are reapplied to multiplier 17. There they are again multiplied by the binary equivalent of ten and the resultant product passes through extractor 19. The emergent bits of this number then again enter delay unit 21. However, by the time the most significant four bits begin to emerge from the extractor, control unit 11 once again supplies a train of gating pulses to that unit to divert them to converter 23. On simultaneously emerging from the latter these four bits are applied to the group of gating circuits in matrix 9 corresponding to the next most significant decimal digit. At the same time those gating circuits are actuated by a pulse from the second output lead of control unit 11. The gating circuits for the next decimal digit are thereby set to produce trains of pulses representing the bits of the binary coded decimal equivalent of the next most significant decimal digit. By cyclically repeating the foregoing sequence, gating matrix 9 is caused to produce the binary coded equivalents of all decimal digits in the decimal value of the binary input word translated.

In the event that a sexagesimal pulse was received at terminal 7 at the start of the translation operation, sexagesimal gating unit 13 is actuated. As a result, at the start of the fourth passage of a number through multiplier 17 the sexagesimal gating unit causes the former unit to multiply the number by six rather than by ten, as is required for translating sexagesimal numbers. This change in operation is achieved by utilizing control unit 11 to provide a series of gating pulses to sexagesimal gating unit 13 at the time the fourth passage through multiplier 17 begins. If unit 13 had previously received a sexagesimal pulse at terminal 7, the gating pulses from control unit 11 cause unit 13 to apply pulses to multiplier 17 which actuate a switching circuit to change its multiplying factor from ten to six. After the fourth cycle of multiplication, control unit 11 ceases applying gating pulses to sexagesimal gating unit 13 and multiplier 17 applies a factor of ten in the remaining cycles of the translation process. Before a new number enters the decoder sexagesimal gating unit 13 is returned to the inactive state by a pulse from control unit 11.

The logic circuit diagram of Figs. 2 and 2A is a specific embodiment of the functional arrangement of Fig. 1. This utilizes certain packaged units which perform logic functions, as follows:

"AND"—This unit produces an output pulse only when pulses are present simultaneously at all of its input terminals. In Fig. 2 and 2A all AND units have two input terminals, the upper one being designated the gating terminal and the lower one the signal terminal. In this specification each AND unit will be referred to as an AND.

"OR"—This unit produces an output pulse if a pulse is present at any one or more of its input terminals. In Figs. 2 and 2A all OR units have two input terminals. In this specification each OR unit will be referred to as an OR.

"INHIBIT"—This circuit produces an output pulse in response to a pulse applied to its input terminal only if no pulse is simultaneously present at its inhibit terminal. A pulse at the inhibit terminal, which is denoted by a semi-circle, blocks any input pulses and assures that no output pulse will be produced. In this specification each Inhibit unit will be referred to as an INH.

"MEMORY"—This circuit has set "1" and set "0" input terminals. It produces a continuous train of output pulses in response to application of one or more pulses to the set "1" terminal. A pulse at the set "0" terminal stops production of output pulses. No output pulse is produced if pulses are simultaneously applied to both input terminals. In this specifictaion each Memory unit will be referred to as a MEM.

"DELAY"—This circuit, symbolized in the drawings by a box containing the letter "D," delays an entering pulse by a time interval equal to a particular number of digit times indicated by the number preceding the letter "D." Each of the four logic elements noted above also introduces a delay of one-quarter of a digit time. In this specification each Delay unit will be referred to as a DEL.

While many specific circuits for performing these logic functions are well known, a satisfactory set is disclosed in the article "Regenerative Amplifier for Digital Computer Applications," by J. H. Felker, appearing on pages 1584 through 1596 of the November 1952 issue of the "Proceedings of the Institute of Radio Engineers," volume 40, number 11. As disclosed in that article, a pulse regenerator to maintain the proper shape and timing of all pulses is an important part of these logic circuits. The specific pulse regenerator circuit shown in the article operates satisfactorily and may be used. Alternatively, an improved version of the regenerator which appears in Mr. Felker's copending application Serial No. 376,923, filed August 27, 1953, and assigned to applicant's assignee, may also be used.

In Figs. 2 and 2A the portions of the circuit which perform the functions of the various units of Fig. 1 have been designated with the same reference numerals, except that point converter 14 of Fig. 1 is not included because it is assumed that all input numbers from the computer are in the correct range of magnitudes as described. If actually required, it may be any of the wide variety of serial digital multipliers and dividers known in the art. For example, suitable logic circuits for either a multiplier or a divider are described in the article "Typical Block Diagrams for a Transistor Digital Computer" by J. H. Felker, appearing on pages 175 to 182 of the Transactions of the American Institute of Electrical Engineers, volume 71, 1952, Part I—Communication and Electronics.

Control unit 11 is a ring counter having eleven identical stages. The first stage 11*a* comprises an AND the output of which is connected to the set 0 terminal of a MEM. The output terminal of the MEM is connected back to the signal terminal of the AND. The remaining ten stages of control unit 11, namely 11*b* through 11*k*, are each identical to stage 11*a*. The interconnections between stages comprise, first, connection of the gating terminal of the AND of each stage to a common terminal 11*m*; and second, connection of the output terminal of the AND of each stage to the set 1 terminal of the MEM of the following stage. In the case of the MEM of the last stage 11*k*, the output terminal of its AND is connected to the set 1 terminal of the MEM of the first stage, thereby establishing a closed ring.

Terminal 11*m* is the actuating terminal of the ring counter, since a pulse occurring there causes the counter to go through one step in its complete cycle. Terminal 12, to which zero word pulses are applied, is connected to terminal 11*m* through the series combination of a ¾ digit time DEL 25, an INH 27 via its input terminal, and an OR 29. The inhibit terminal of INH 27 is connected to the output terminal of the MEM of stage 11*k* via a conductor 30. The other input terminal of OR 29 is connected through a one digit time DEL 31 to start pulse terminal 5.

Control unit 11 is in the quiescent state when the MEM of the last stage 11*k* is active, since output pulses from that unit block INH 27 and prevent word pulses at terminal 12 from reaching terminal 11*m*. Now suppose that a start pulse is applied to terminal 5 at T(0). It passes through OR 29 to reach terminal 11*m* at T(1¼). There an output pulse is produced by the AND of stage 11*k*, since its signal terminal is receiving pulses from the output terminal of the MEM of that stage. This output pulse, applied to the set 0 terminal of the same MEM, turns that MEM off. In addition, the same output pulse appears at the set 1 terminal of the MEM of the first stage 11*a* and turns that unit on. A train of pulses is thereby initiated at the output terminal of the MEM of stage 11*a*, and starts at T(1¾) due to passage of the start pulse from terminal 11*m* through a further delay of ¼ digit time in both the AND of stage 11*k* and the MEM of stage 11*a*.

Since the MEM of stage 11*k* is now off, INH 27 is no longer blocked. If a series of word pulses occurring at T(0) is applied to terminal 12, then the one of such pulses occurring in the word pulse cycle immediately following that during which the start pulse occurred can pass through units 25, 27 and 29 and reach terminal 11*m* at T(1¼) of the following word pulse cycle. That is, sixteen digit times after the start pulse the word pulse will react on control unit 11 in the same manner as did the start pulse, except that now it will be the MEM of stage 11*b* which is turned on while the MEM of stage 11*a* is turned off. Sixteen digit times later the next word pulse will turn off the MEM of stage 11*b* and turn on the MEM of stage 11*c*. Consequently, a series of sixteen pulses is produced at the output terminal of the MEM of stage 11*a* extending from T(1¾) to T(16¾), followed by a series of sixteen pulses at the output terminal of the MEM of stage 11*b* extending over the same digit times but during the next word pulse cycle. Relative to the start pulse as a time reference, this will be from T(17¾) to T(32¾). The same sequence occurs successively at the output terminals of the MEM's of stages 11*c* through 11*j*.

The output terminals of the MEM's of alternate stages 11*a*, 11*c*, 11*e*, 11*g*, and 11*i* are connected in common to one output terminal 110 of control unit 11. In the case of the MEM of stage 11*g*, this connection includes a diode 112 which is poled to permit pulses from that MEM to reach terminal 110 but to prevent pulses from the MEM of any of the other stages from reaching the output terminal of the MEM of stage 11*g*. The MEM's of these five stages result in successive groups of sixteen pulses being produced at output terminal 110 at intervals of sixteen digit times between groups, the first pulse in any group occurring thirty-two digit times after the first pulse in the preceding group. The output terminals of the MEM's of the remaining stages 11*b*, 11*d*, 11*f*, 11*h*, and 11*j* are connected in common to another output terminal 111 of control unit 11, and there result in production of the same type of pulse groups in the intervals of sixteen digit times between successive groups of pulses at output terminal 110. In the case of the MEM of stage 11*j*, its connection to terminal 111 includes a diode 113 poled to permit pulses from that MEM to reach terminal 111 but to prevent pulses from any other MEM's from reaching the output terminal of the MEM of stage 11*j*.

It is to be noted that even if a pulse from the MEM of a stage of control unit 11 which is connected to one of output terminals 110 or 111 should be fed back via that connection to the AND of the next stage connected to that terminal (which will be the second succeeding stage of control unit 11) no untoward result will be produced. The next stage remains inactive in response to the word pulse succeeding that which actuated any of the stages in question, and feedback of this type will only further tend to assure that condition. In the case of stages 11*g* and 11*j*, the presence of diodes 112 and 113 prevents such feedback altogether. The reason for including these diodes is that the output terminals of the MEM's of these stages are respectively connected via leads 114 and 115 to sexagesimal gating unit 13, as will be described in detail hereinafter. These leads must only be pulsed when the MEM's of these stages, respectively, are on, and the diodes assure that this will be the case.

Besides producing the foregoing series of pulses at output terminals 110 and 111, control unit 11 is utilized to provide a single pulse successively at five output leads respectively connected to the output terminals of the AND's of stages 11*b*, 11*d*, 11*f*, 11*h*, and 11*j*. These pulses therefore occur at intervals of thirty-two digit times. Each of these leads will be identified as being from the following stage of control unit 11, since the digit time at which each is pulsed is one-quarter digit time before the MEM of the following stage produces the first of its output pulses. In total, therefore, the digit times during which control unit 11 produces pulses at its respective output terminals and output leads are as shown in the following Table 4:

*Table 4*

| Stage Producing Output Pulses | | Stage of Pulsed Control Unit Output Lead | Digit Times |
|---|---|---|---|
| Control Unit Output Terminal 110 | Control Unit Output Terminal 111 | | |
| 11*a* | | | 1¾ to 16¾ |
| | | 11*b* | 17½ |
| | 11*b* | | 17¾ to 32¾ |
| 11*c* | | | 33¾ to 48¾ |
| | | 11*d* | 49½ |
| | 11*d* | | 49¾ to 64¾ |
| 11*e* | | | 65¾ to 80¾ |
| | | 11*f* | 81½ |
| | 11*f* | | 81¾ to 96¾ |
| 11*g* | | | 97¾ to 112¾ |
| | | 11*h* | 113½ |
| | 11*h* | | 113¾ to 128¾ |
| 11*i* | | | 129¾ to 144¾ |
| | | 11*j* | 145½ |
| | 11*j* | | 145¾ to 160¾ |

The output of the last stage 11*k* is not included in Table 4 since it is not connected to either output terminal 110 or 111 of control unit 11. A train of pulses is initiated there at T(161¾), ten word pulse cycles after the start pulse turned on the MEM of the first stage 11*a*. This causes INH 27 to block further word pulses from reaching terminal 11*m*, so that control unit 11 remains quiescent until a new start pulse is applied to terminal 5 preparatory to application of a new input number to the translator.

The timing relations herein require that the start pulse at terminal 5 precede the application to input terminal 3 of the first (least significant) bit of the number to be translated by three-quarters of a digit time. Consequently, that digit is applied to input terminal 3 at T(¾), and the remaining fourteen significant bits follow in order up to T(14¾). Terminal 3 is connected to both the input terminal of an INH 152 and the signal terminal of an AND 153 included in divider 15. The gating terminal of AND 153 and the inhibit terminal of INH 152 are both connected to a divider control terminal 154. The output terminal of INH 152 is connected to a two digit time DEL 155, to the output of which is connected the output terminal of AND 153.

If no pulses are applied to control terminal 154, AND 153 will not be gated and INH 152 will not be blocked. A number applied to input terminal 3 will then pass through INH 152 and DEL 155, and will appear at the output of the latter with the first digit occurring at T(3). If, however, pulses are applied to control terminal 154, then a number applied to terminal 3 will pass through AND 153 and appear at the output of DEL 155 with the first digit occurring at T(1). Since an advance of each digit in a number by two digit times is equivalent to dividing by the binary number four, divider 15 is effective to divide an input number by four when pulses are applied to its control terminal 154.

Control terminal 154 is connected to the output of a one-half digit time DEL 131 included in sexagesimal gating unit 13. Within that unit, the input terminal of DEL 131 is connected to the output terminal of a MEM 132, the latter terminal also being connected to the signal terminal of an AND 133 through a one-half digit time DEL 134. The gating terminal of AND 133 is connected via lead 114 to the output terminal of the MEM of stage **11*g* of control unit 11. The set 0 terminal of MEM 132 is connected through a one-quarter digit time DEL 135 and via lead 115 to the output terminal of the MEM of stage 11*j* in control unit 11. The set 1 terminal of MEM 132 is connected to sexagesimal pulse terminal 7. If a member is to be translated to its sexagesimal value, a pulse is applied to terminal 7 at T(0) simultaneously with the start pulse at terminal 5. The MEM 132, which is "off" up to this time, is thereby turned "on" and produces the first of its output pulses at T(¼). This propagates through DEL 131 and reaches control terminal 154 of divider 15 at T(¾), concurrently with the first bit in the input number applied to terminal 3. In this way the pulses from MEM 132 cause divider 15** to divide the input number by four, as described above.

The output terminal of DEL 155 is connected to input terminal 171 of a multiplier 17. In the latter, the signal terminal of an AND 172 and the input terminal of an INH 173 are connected together and to terminal 171. The output terminal of INH 173 is connected to a one and three-quarter digit time DEL 174, and the output terminal of AND 172 is connected to a three-quarter digit time DEL 175. The output terminals of these two DEL's are connected together and to the augend terminal of an adder 176. The addend terminal of adder 176 is connected directly to input terminal 171. Adder 176 comprises a combination of AND's, OR's and INH's in well known configuration to produce the sum of the numbers applied to the addend and augend terminals. A typical adder circuit of this type is shown in Fig. 9 of the article "Typical Block Diagrams for a Transistor Digital Computer" by J. H. Felker, cited above.

The output terminal of AND 133 in sexagesimal gating unit 13 is connected to both the blocking terminal of INH 173 and the gating terminal of AND 172. When AND 133 is not producing output pulses, which is the normal case, INH 173 is not blocked and AND 172 is not gated. Consequently, the number at terminal 171 is conveyed through INH 173 and DEL 174 to the augend terminal of adder 176, reaching it after a delay of two digit times. This corresponds to multiplication by the binary value four. Also, the number at terminal 171 directly reaches the addend terminal without undergoing any delay. The adder therefore produces the sum of the number of terminal 171 plus four times that number, or equivalently, five times the input number. By proper design, adder 176 can be made to introduce a further delay of one digit time between its input and output terminals, corresponding to binary multiplication by two. The result is that at the output of adder 176 is produced a binary product which is two times five, or ten times, the binary number applied at input terminal 171.

If MEM 132 has been actuated by a sexagesimal pulse at terminal 7, and when the MEM of stage **11*g* of control unit 11 is producing output pulses, AND 133 will be pulsed at both its signal and gating terminals and will supply pulses which block INH 173 and gate AND 172. The number at terminal 171 will then pass through AND 172 and DEL 175 and reach the augend terminal of adder 176 after a delay of one digit time. This corresponds to multiplication by the binary value two. Adder 176 will then produce the sum of the number applied to terminal 171 plus two times that number, giving three times the applied number. The additional one digit time delay in passing to the output terminal of adder 176 multiplies this quantity by two, so that the net product will be six times the number applied to terminal 171**.

To understand the operation of the circuitry described thus far, suppose that an input number at terminal 3 is to be translated to its decimal value, so that no sexagesimal pulse is applied to terminal 7. As explained previously, the first (least significant) bit reaches terminal 171 at T(3) and the fifteenth (most significant) at T(17). Multiplication of any number by the binary equivalent of ten, or 1010, produces a product having four more bits and of which the least significant is coincident with the least significant bit of the multiplicand and the most significant is four digit times later than the most significant bit of the multiplicand. However, since the least significant bit of the product produced by multiplying by ten is always zero, it has no significance. The product may therefore be considered to consist of three more bits than the initial number. Consequently, the product at the output of adder 176 comprises eighteen bits at T(4) to T(21). In accordance with the preceding description of the arithmetic rules underlying the operation of the invention, the four bits occurring at T(18) to T(21), which are the fifteenth through eigtheenth bits of the product, comprise the binary coded equivalent of the most significant decimal digit in the decimal value of the input number being translated.

The output terminal of adder 176 constitutes the output terminal of multiplier 17, and is connected to the signal terminals of each of two AND's 191 and 193 which together comprise extractor 19. The gating terminal of AND 191 is connected through a one-quarter digit time DEL 25 to output terminal 110 of control unit 11. The gating terminal of AND 193 is connected through a one-quarter digit time DEL 29 to output terminal 111 of control unit 11.

As shown in Table 4, pulses initially occur at terminal 110 from T(1¾) to T(16¾). After passing through DEL 25 these will gate AND 191 from T(2) to T(17). Since the first and all through the fourteenth bits of the number emerging from multiplier 17 occur at T(4) to T(17), they emerge from AND 191 at T(4¼) to T(17¼) and to input terminal 210 of delay loop 21 connected thereto. At T(18) and 191 is no longer gated since pulses cease at terminal 110 of control unit 11. However, AND 193 is then gated for sixteen digit times by pulses from terminal 111 passing through DEL 29. The fifteenth through the eighteenth bits of the product emerging from multiplier 17 therefore pass through AND 193 and via conductor *z* to the serial-to-parallel converter 23 connected thereto. These bits are the desired ones, as explained above.

The fifteenth bit emerges from AND 193 at T(18¼) and the eighteenth at T(21¼). Conductor $z$ is connected to the input terminals of each of four DEL's 231, 233, 235, and 237 in converter 23 which introduce delays, respectively, of one-quarter, one and one-quarter, two and one-quarter, and three and one-quarter digit times. Since these delays are spaced one digit time apart, all four extracted bits will simultaneously appear at the output terminals of the DEL's at T(21¼). The eighteenth bit will emerge from DEL 231, the seventeenth bit from DEL 233, the sixteenth bit from DEL 235, and the fifteenth bit from DEL 237. These bits are respectively, the binary values of the $2^3$, $2^2$, $2^1$, and $2^0$ places in the binary equivalent of the most significant decimal digit in the decimal value of the number being translated.

The output terminals of the DEL's in converter 23 are connected to gating matrix 9. This comprises five distinct sections $d1$ through $d5$ which are respectively set to states which represent the five decimal digits which the translator produces, in order from the most to the least significant. Considering section $d1$, this includes four AND's 911, 912, 913, and 914, having their output terminals respectively connected to the set 1 terminals of four MEM's 915, 916, 917, and 918. The signal terminals of all four AND's are connected in common. The gating terminal of the first AND 911 is connected to the output terminal of DEL 231 in converter 23; the gating terminal of the second AND 912 is connected to the output terminal of DEL 233 in converter 23, and similarly AND's 913 and 914 have their gating terminals respectively connected to DEL's 235 and 237.

Sections $d2$ through $d5$ are identical with section $d1$ of matrix 9 and are connected in the same manner. Thus all AND's having the same last digit in their references numerals have their gating terminals connected to the same DEL in converter 23. In addition, the set "0" terminals of all of MEM's 915 through 955 are connected in common to the start pulse terminal 5 via a connecting lead $y$ and a three-quarters digit time DEL 35. In this manner, application of a start pulse at terminal 5 at the start of a new translation operation also resets all MEM's in matrix 9 to their inactive states.

The commonly connected signal terminals of the AND units of each of sections $d1$ through $d5$ are respectively connected to five DEL's 37, 39, 41, 43, and 45 which each introduce a delay of four digit times. These, in turn, are respectively connected to the output leads of control unit 11. Referring to Table 4, and considering the four digit time delay introduced by DEL 37, all four AND's in section $d1$ of matrix 9 are pulsed at their signal terminals at T(21½) for one digit time. At that same instant the gating terminal of each AND unit in section $d1$ is supplied with one of the four bits then simultaneously emerging from converter 23. Consequently, the bits pass through the AND's and set MEM's 915 through 918 in section $d1$ to respectively represent these bits in order of decreasing significance. That is, the state of MEM 915 will represent the $2^3$ bit, the state of MEM 916 will represent the $2^2$ bit, that of MEM 917 the $2^1$ bit, and that of MEM 918 the $2^0$ bit of the binary equivalent of the most significant decimal digit in the decimal value of the binary input number being translated.

As stated above, the first through the fourteenth bits of the product produced by multiplier 17 are applied to terminal 210 of delay loop 21 at T(4¼) to T(17¼). Within that loop, terminal 210 is connected to a fifteen and one-half digit time DEL 211, the output terminal of which is connected to both the input terminal of an INH 213 and the signal terminal of an AND 215. The inhibit terminal of INH 213 and the gating terminal of AND 215 are both connected to a conductor 31 connected to output terminal 111 of control unit 11. The output terminal of AND 215 is connected through a one-quarter digit time DEL 217 to terminal 210. The output terminal of INH 213 is connected to the input terminal 171 of multiplier 17.

The bits entering at terminal 210 undergo a delay of fifteen and one-half digit times in DEL 211, emerging at T(19¾) to T(32¾). Reference to Table 4 shows that pulses are produced at terminal 111 of control unit 11 at T(17¾) to T(32¾), so that INH 213 is blocked and AND 215 is gated when these bits reach them. All bits therefore pass through AND 215 and DEL 217, and arrive back at terminal 210 at T(20¼) to T(33¼). They then proceed again to pass through DEL 211, this time emerging at T(35¾) to T(48¾). During this interval no pulses are produced at terminal 111, so INH 213 is not blocked and AND 215 is not gated. All bits thereby pass through INH 213 and appear at input terminal 171 of multiplier 17 at T(36) to T(49). This is a total of only fourteen significant bits. However, it may be considered that actually a total of fifteen bits has arrived, from T(35) to T(49), by simply assuming the presence of a least significant zero at T(35). Since any number of zeros can be added after the least significant place of a decimal number less than one, this is mathematically permissible. This zero, in effect, is substituted for the bits which were extracted in the passage through extractor 19.

Comparing the number now entering multiplier terminal 171, at T(35) to T(49), with the initial input number applied thereto, at T(3) to T(17), it is seen that the recirculated number is delayed exactly thirty-two digit times with respect to the initial number. In addition, each of output terminals 110 and 111 carry identical pulse trains at intervals of thirty-two digit times, and successive ones of the output leads of stages 11$b$, 11$d$, 11$f$, 11$h$, and 11$j$, of control unit 11 carry a gating pulse at intervals of thirty-two digit times. As a result, all conditions are identical to those existing when the initial input number entered the translator, and all operations repeat identically, except that now section $d2$ of matrix 9 will be actuated instead of section $d1$. This is because section $d2$ is the one connected to the next output lead, from stage 11$d$, of control unit 11 following the output lead from stage 11$b$. The binary coded equivalent of the next to the most significant decimal digit in the decimal value of the binary number being translated therefore will be represented by the states of MEM's 925 through 928 in section $d2$ of matrix 9.

The foregoing cyclic operation repeats five times, so that the binary coded equivalent of each decimal digit in the decimal value of the number to be translated is represented by the states of the MEM's in sections $d1$ through $d5$ of matrix 9. At T(161¾), or ten word pulse cycles after the first output pulse is produced by control unit 11 at the output terminal of the MEM of stage 11$a$, the memory unit of the last stage 11$k$ in the control unit is actuated and blocks INH 27 simultaneously with arrival there of the tenth word pulse after the one which resulted in the first output pulse referred to. Consequently, no further output pulses are produced by control unit 11. Ten word pulse cycles consume 160 digit times and, since each cycle of multiplication and extraction consumes thirty-two digit times, correspond to five cyclic translation operations. The translator therefore ceases operation after producing the desired five binary coded decimal digits, except that the MEM's in matrix 9 continue to represent those digits until a new start pulse is received at terminal 5 preparatory to application of a new input number to the translator.

The operation of the translator in deriving sexagesimal values will now be considered. The maximum possible departure of an angular quantity from any required value is 180°00′. This may be either positive or negative, but since only the actual magnitudes of numbers are supplied to the translator, in all cases they will appear as positive quantities corresponding to angles no greater than 180°. If all binary numbers representing sexagesimal values are put in a form such that the largest of them has a sexagesimal value less than one and greater than one-tenth, as required by the translator, none will exceed 0.18000. The binary equivalent of this is 0.001+, so that all members to be translated to their sexagesimal values will be supplied to the translator with zeros in the two most significant places to the right of the binary point. The computer supplying the translator has a limited capacity, this being fifteen bits to the right of the binary point in the case assumed herein. Since the most significant two zeros are not actually significant information, being present in all sexagesimal numbers, this means that in the absence of some special provision not applicable to decimal translation numbers supplied to the translator for sexagesimal translation will actually consist of only thirteen significant bits.

In order to bring up this degree of accuracy to the same level as that of numbers representing decimal values, it is desirable to program the computer to multiply all numbers representing sexagesimal values by four. This shifts the binary point two places to the right, eliminating the two zeros referred to, and permitting a full total of fifteen significant bits to be retained. The binary number representing the maximum possible sexagesimal value translator will then be 0.1+.

If this arrangement for improving accuracy is utilized in the computer, numbers which have been so multiplied prior to entering the translator must be divided by four in order to restore them to their correct magnitudes relative to that of numbers which have not undergone such prior multiplication. Alternatively, all numbers representing decimal values could be multiplied by four prior to translating them since that also would restore the relative magnitudes to the correct relationship. It is the relative magnitudes which must be preserved, rather than the absolute magnitudes, since by extracting the four most significant bits after passage of any number through multiplier 17 the correct result will be attained regardless of how the number has been shifted or delayed. The timing relationship between all input pulses to the translator and all internally produced gating pulses must be determined so that this will be the case.

In accordance with the foregoing description, the described translator is designed to accept input numbers which have already been multiplied by four if they are to be translated to sexagesimal values. It is for this reason that divider 15 is provided. As described above, when an input number is to be translated to its sexagesimal value, a pulse is applied at terminal 7 to cause sexagesimal gating unit 13 to gate AND 153 and block INH 152 in divider 15. The input number therefore passes from terminal 3 through AND 153 and reaches input terminal 171 of multiplier 17 with its bits extending from T(1) to T(15). This interval is two digit times earlier than in the case of translation to a decimal value, and so in comparison the input number has been effectively divided by 4. This can be expressed by regarding the number so reaching terminal 171 as comprising seventeen bits, with the two most significant bits at T(16) and T(17) being zeros.

This number enters multiplier 17, undergoes multiplication by ten, and the product emerges at T(2) with a total of twenty bits of which the two most significant are zeros due to the described two digit time shift in divider 15. Since AND 191 is gated from T(2) to T(17) by pulses from terminal 110 of control unit 11, the first bit of the product produced by multiplier 17 passes through AND 191 and to delay loop 21, as do all bits up to and including the sixteenth at T(17). The last four bits occur at T(18) to T(21), when AND 191 is no longer gated. Since AND 193 is gated starting at T(18) by pulses from terminal 111 of control unit 11, these four bits do pass through AND 193 and are extracted.

By comparison with the description given previously of translation of an input number to its decimal value, it will be seen that the extracted bits in the sexagesimal case occur at the same digit times as the extracted bits in the decimal case, and so will be handled in an identical manner. That is, section *d*1 in matrix 9 will be so energized that the states of its MEM's will represent the binary equivalent of the most significant decimal digit in the sexagesimal number being translated.

The sixteen bits not extracted in the foregoing cycle leave AND 191 of extractor 19 at T(2¼) to T(17¼). This is one less bit than in the initial number, as in the decimal case. These bits enter terminal 210 of delay loop 21 and emerge from DEL 211 at T(17¾) to T(32¾). Since pulses from terminal 111 of control unit 11 block INH 213 and gate AND 215 at T(17¾) to T(32¾), all the bits pass through AND 215 and DEL 217 to arrive back at terminal 210 at T(18¼) to T(33¼). They then proceed once more through DEL 211, this time emerging at T(33¾) to T(48¾). Reference to Table 4 shows that over this interval no pulses exist at terminal 111, so INH 213 is no longer blocked and AND 215 is no longer gated. All bits therefore pass to input terminal 117 of multiplier 17 at T(34) to T(49). The most significant bit, at T(49), arrives at exactly the same digit time as the most significant bit of the first recirculated product in the case of translation of the binary equivalent of a decimal number. It also arrives exactly thirty-two digit times after the most significant bit of the initial number applied to terminal 117. The least significant bit reaches terminal 117 at T(34). However, as in the case of decimal numbers, it can be considered that a least significant zero bit is present at T(33). This is permissible because any number of least significant zeros may be added to the right of the binary point of any number. The complete number reaching terminal 171 after one translation cycle therefore comprises seventeen bits extending from T(33) to T(49), and so is exactly thirty-two digit times after the initial input number entered multiplier terminal 171 at T(1) to T(17).

This recirculated number now begins a new translation cycle, entering multiplier 17 and emerging at T(34) to T(53). AND 191 in extractor 19 is now gated from T(34) to T(49) by pulses from terminal 110 of control unit 11, so the sixteen bits existing at these digit times pass through to delay loop 211. AND 193 is gated by pulses from terminal 111 of control unit 11 starting at T(50), so the four bits existing at T(50) to T(53), which are the four most significant, pass through that AND and are extracted. Comparing these digit times with those existing during the first translation cycle, it is seen that they are all exactly thirty-two digit times later. The situation is therefore identical to that in the case of decimal translation, and the translator goes through an additional cycle identical with the first two. This results in sections *d*1 through *d*3 of matrix 9 being set to represent the binary coded equivalents of the three decimal digits of the number of degrees in the sexagesimal value of the number being translated.

In the fourth translation cycle the foregoing operation is modified in accordance with the arithmetic rule for deriving sexagesimal values which requires multiplication by six rather than by ten. The incoming recirculated number to input terminal 171 of multiplier 17 at the start of the fourth passage through the latter occurs at T(97) to T(113), which is three intervals of thirty-two digit times after the initial number to be translated entered that terminal. Reference to Table 4 shows that the output terminal of the MEM of stage 11*g* of control unit 11 is pulsed from T(97¾) to T(112¾). Via conductor 114 these pulses reach the gating terminal of AND 133. Since the signal terminal of that unit receives pulses continuously from MEM 132 via DEL 134 starting at T(¾), AND 133 produces output pulses which are applied to the inhibit terminal of INH 173 and the gating terminal of AND 172 in multiplier 17 from T(98) to T(113). INH 173 is thereby blocked and AND 172 is gated during that interval.

Each cycle of extraction of bits results in addition of a least significant zero to the product which is recirculated. This was pointed out above in the description of the translation of both decimal and sexagesimal values. Consequently, after three cyclic extractions the recirculated number entering terminal 171 has at least three least significant zeros in the first, second, and third places. These bits occur at T(97) to T(99). As a result, even though the first bit arrives at terminal 171 before INH 173 is blocked and AND 172 is gated, this has no effect on that bit. Least significant zeros only serve to fix the time relations of following significant bits, and can be regarded as being present only to clearly emphasize those relations. They can be considered as passing through any unit whether or not it is gated or blocked. Since all the significant bits occur at T(100) to T(113), an interval during which AND 172 is gated, they all pass through that unit. For continuity, therefore, all three least significant zeros at T(97) to T(99) will also be considered as passing through AND 172. The complete incoming number thereby passes through the multiply-by-six channel of multiplier 17.

Multiplication by six, or 0110 in binary form, results in a product having two more bits and of which the least significant bit is delayed one digit time relative to the least significant multiplicand bit and the most significant bit is delayed three digit times relative to the most significant multiplicant bit. Since the number at input terminal 171 occurs at T(97) to T(113), the least significant bit of the product emerges from multiplier 17 at T(98) and the three most significant bits at T(114) to T(116). If it be noted that the maximum possible number of minutes in a sexagesimal number is sixty, it will be evident that the largest digit which can be translated in the fourth translation cycle is six. The binary equivalent of six only requires three binary places, so only three most significant bits of the product produced in the fourth translation cycle must be extracted.

As shown in Table 4, from T(98) to T(113) AND 191 is gated by pulses from terminal 110 of control unit 11, so that all sixteen bits of the product which are produced at those times pass through that unit to input terminal 210 of delay loop 21 at T(98¼) to T(113¼). At T(114) AND 193 starts to be gated by pulses from terminal 111 of control unit 11, and thereby extracts the three most significant bits of the product. These pass via lead $z$ to converter 23 and simultaneously emerge at the three lowest order output terminals of the latter at T(117½). Note that the absence of a product bit at T(117) will be the same, in effect, as if a fourth zero bit at that time had been applied to converter 23. At T(117½) a gating pulse from the output lead from stage 11$h$ of control unit 11 reaches the four AND's of section $d4$ of matrix 9 via DEL 43. Consequently, all those AND's are gated to pass the bits referred to, and set the MEM's of section $d4$ of the matrix to states representing the binary coded equivalent of the most significant decimal digit in the number of minutes of the sexagesimal value of the number being translated.

The bits entering delay loop terminal 210 at T(98¼) to T(113¼) recirculate through delay loop 21 in the same manner as do all other numbers as described above, undergoing a total delay of thirty-one and three-quarters digit times, and emerge from INH 33 at T(130) to T(145). As in all cases, a least significant zero may be considered to exist at T(129). This gives a total recirculated number consisting of seventeen bits at T(129) to T(145). This time interval is the same as that in which all numbers which previously circulated through multiplier 17 arrived at that terminal, except that it is delayed thirty-two digit times relative to the fourth such circulation. Also, since the MEM of stage 11$g$ of control unit 11 is now no longer actuated, the multiply-by-ten channel of multiplier 17 is again in control because INH 173 will no longer be blocked and AND 172 will no longer be gated. The net result is that the last group of four bits is extracted, following which the MEM of stage 11$k$ of control unit 11 again stops further operation of the translator until application of a new start pulse, as in the case of the decimal translation process. Note that MEM 132 of sexagesimal gating unit 13 is reset by the first pulse produced by stage 11$j$ of control unit 11, since the MEM of that stage is connected via lead 115 and DEL 135 to the set zero terminal of MEM 132. The latter unit is turned off by this pulse at T(146).

Many possible logic matrices may be devised to convert each group of four bits represented by the states of the MEM's in each of the sections $d1$ through $d5$ of matrix 9 to a true decimal display. Matrices for this purpose are well known in the art, a typical example being that shown in Fig. 3. This is connected to only one of sections $d1$ to $d5$ of matrix 9, five identical matrices therefore being required for all sections. The circuit of Fig. 3 will be described on the basis that it is connected to MEM's 915 through 918 of section $d1$.

As explained previously, the states of MEM's 915 through 918 respectively represent the $2^3$, $2^2$, $2^1$, and $2^0$ bits of the binary equivalent of the first (most significant) translated decimal digit. The output terminal of MEM 915 is connected to a one-quarter digit time DEL 515 and the inhibit terminal of an INH 615. The output terminal of MEM 916 is connected to a one-quarter digit time DEL 516 and the inhibit terminal of an INH 616. Similarly, MEM 917 is connected to DEL 517 and INH 617 and MEM 918 is connected to AND 518 and INH 618. The input terminal of each INH is connected to a terminal 53 to which is applied a train of pulses occurring one in each digit time. These may be more conveniently derived from the first of the two ring counters comprising the word pulse generator in the computer feeding the translator. They may alternatively be derived from the output of a MEM which is put into its set one state and left in that condition. For example, the zero word pulse could be applied through a three-quarters digit time delay unit to the set one terminal of such a MEM. In this manner the MEM will produce a pulse in each whole-numbered digit time. As explained above, MEM's 915 through 918 are actuated by their respective associated AND's 911 through 914. The latter units produce output pulses at T(21½), so that the MEM's are actuated at T(21¾). If the bit applied to any memory unit is a one, that unit will produce output pulses starting at T(22) and in each ensuring whole-numbered digit time. Consequently, pulses from terminal 53 and from any of MEM's 915 to 918 reach AND's 515 through 518 and INH's 615 through 618 (Fig. 3) simultaneously.

If any one of MEM's 915 to 918 is on, pulses from it block the associated INH but appear at the output of the associated DEL, so that a train of pulses will be produced at the output of the DEL and none at the output of the INH. If a given MEM is not actuated, no pulses are produced by the DEL but a train of pulses from terminal 53 appear at the output of the INH. Since each MEM produces output pulses when the value of the bit it represents is one and no output pulses when the value of the bit it represents is zero, the presence of pulses at the output of any DEL indicates a one bit while the presence of pulses at the output of any INH indicates a zero bit. With this arrangement, for each of the decimal digits zero to nine a particular combination of four of the DEL's and INH's will be producing pulses, one such unit being connected to each of MEM's 915 to 918. Detection of which four units are so actuated is most easily detected by connecting all the combinations of four units representing the ten decimal digits to individual AND's having four input terminals.

Since an AND may simply comprise a number of diodes all connected to a common terminal and supplied with appropriate shunting bias voltages, as is well known in the art, an AND with four input terminals is hardly more complicated in construction than an AND with two input terminals. In Fig. 3 there is shown a bank of ten such AND's, designated 570 and 579. Each of them, when actuated, represents the decimal digit which is the same as the last digit in its reference numeral. The output terminals of these units are, therefore, respectively designated zero to nine. These terminals could actually be connected to the filaments of neon glow lamps to provide a visual display of the translated decimal digits.

The connections between AND's 570 to 579 and the output terminals of DEL's 515 to 618 and INH's 615 to 618 may be most clearly understood from an example. Considering AND 575, it represents the decimal digit five. In four binary places, as required by the four MEM's 515 to 518, this is equivalent to 0101. The most significant bit is a zero, the next a one, the next a zero, and the least significant a one. This situation corresponds to pulses being present at the output terminals of INH 615, DEL 516, INH 617, and DEL 518. Consequently, AND 575 is connected to those terminals. By writing the binary equivalent for each of the decimal digits zero to nine, and connecting the input terminals of each of AND's 570 to 579 to those of the output terminals of DEL's 515 to 518 and INH's 615 to 618 which represent the bits in those equivalents, the complete matrix for translation to true binary form is obtained. The matrix connections in Fig. 3 are in accordance with this system.

It will be apparent to those skilled in the computing art that many alternative logic circuits may be devised to perform the functions of the units shown in block form in Fig. 1, and, indeed, that alternative functional units which combine or further subdivide those functions in fewer or simpler units may be assembled.

What is claimed is:

1. A translator for obtaining the binary coded decimal equivalent of a serial binary input number having a predetermined number of bits, comprising a recirculatory loop to which said input number may be applied, extracting means connected to said loop and adapted to remove therefrom those bits of any binary number which lie in denominational positions corresponding to predetermined powers of ten, and multiplying means in said loop adapted to multiply the number represented by the bits remaining therein by a power of ten after each removal of bits by said extracting means.

2. A translator for deriving the value in a second number system of an initial quantity expressed as a predetermined number of digits in a first number system, comprising multiplying means adapted to produce the product in said first number system of any quantity applied thereto and a power of the radix of said second number system, means for applying said initial quantity to said multiplying means, extracting means connected to said multiplying means and having a pair of output paths, said extracting means being adapted to direct those digits of each such product which lie in denominational positions corresponding to predetermined powers of said radix to the first of said paths and to direct the remaining digits of each such product to the second of said paths, means connected to said first path for storing the digits appearing therein, and delay means for connecting the second of said paths to said multiplying means to apply the digits appearing in that path to said multiplying means as a new quantity a predetermined time after the last preceding quantity applied thereto.

3. A translator for deriving the values in a second number system of successive initial quantities occurring at least at predetermined minimum intervals apart, each of said quantities being expressed as the same number of digits in a first number system, comprising multiplying means adapted to produce the product in said first digital number system of any quantity applied thereto and a power of the radix of said second number system, means for applying said initial quantities to said multiplying means, extracting means connected to said multiplying means and having a pair of output paths, said extracting means being adapted to direct those digits of each such product which lie in denominational positions corresponding to predetermined powers of said radix to the first of said paths and to direct the remaining digits of each such product to the second of said paths, means connected to said first path for storing the digits appearing therein, and delay means for connecting the second of said paths to said multiplying means to apply the digits appearing in that path to said multiplying means as a new quantity a predetermined time after the last preceding quantity applied thereto, the product of said time and the number of digits in the derived value of any of said initial quantities being smaller than any of said predetermined minimum intervals between said initial quantities.

4. A translator for deriving the value in a second number system of an initial quantity expressed as a predetermined number of digits in a first number system all lying on the same side of the point separating integral and fractional quantities, comprising multiplying means adapted to produce the product in said first number system of any quantity applied thereto and a multiplier which is a positive integral power of the radix of said second number system when the digits of said initial quantity lie on the right side of said point and which is a negative integral power of the radix of said first number system when the digits of said input quantity lie on the left side of said point, means for applying said initial quantity to said multiplying means, extracting means connected to said multiplying means and having a pair of output paths, said extracting means being adapted to direct those digits of each such product which lie on the opposite side of said point from that of the digits of said initial quantity to the first of said paths and to direct the remaining digits of each such product to the second of said paths, means connected to said first path for storing the digits appearing therein, and delay means for connecting the second of said paths to said multiplying means to apply the digits appearing in that path to said multiplying means as a new quantity a predetermined time after the last preceding quantity applied thereto.

5. A translator for deriving the value in a second number system of an initial quantity comprising a predetermined number of digits in a first number system, comprising point converting means for producing a converted initial quantity by applying to said initial quantity a factor which is the equivalent in said first number system of a power of the radix of said second number system such that all digits of said converted initial quantity lie on the same side of the point which separates integral and fractional quantities, multiplying means connected to said converting means, said multiplying means being adapted to produce the product in said first number system of any quantity applied thereto and a multiplier which is a positive integral power of the radix of said second number system when the digits of said converted initial quantity lie on the right side of said point and which is a negative integral power of the radix of said second number system when the digits of said converted initial quantity lie on the left side of said point, extracting means connected to said multiplying means and having a pair of output paths, said extracting means being adapted to direct those digits of each such product which lie on the opposite side of said point from that of the digits of said converted initial quantity to the first of said paths and to direct the remaining digits of each such product to the second of said paths, means connected to said first path for storing the digits appearing therein, and delay means for connecting the second of said paths to said multiplying means to apply the digits appearing in that path to said multiplying means as a new quantity a predetermined time after the last preceding quantity applied thereto.

6. A translator for deriving the decimal value of an initial binary quantity having a predetermined number of bits all of which lie on the same side of the binary point, comprising binary multiplying means adapted to produce the binary product of any quantity applied thereto and a power of the decimal value ten, means for applying said initial quantity to said multiplying means, extracting means connected to said multiplying means and having a pair of output paths, said extracting means being adapted to direct those bits of each of such product which lie on the opposite side of the binary point from that of the bits of said initial quantity to a first of said paths and to direct the remaining bits of each such product to the second of said paths, means connected to said first path for storing the bits appearing therein, and delay means for connecting the second of said paths to said multiplying means to apply the bits appearing in that path to said multiplying means as a new quantity a predetermined time after the last preceding quantity applied thereto.

7. A translator for deriving the decimal values of successive initial binary quantities occurring at least at predetermined minimum intervals apart, all of said quantities having the same number of bits all lying on the same side of the binary point, comprising binary multiplying means adapted to produce the binary product of any quantity applied thereto and a power of the decimal value ten, means for applying said initial quantities to said multiplying means, extracting means connected to said multiplying means and having a pair of output paths, said extracting means being adapted to direct those bits of each such product which lie on the opposite side of the binary point from that of the bits of each of said initial quantities to the first of said paths and to direct the remaining bits of each such product to the second of said paths, means connected to said first path for storing the digits appearing therein, and delay means for connecting the second of said paths to said multiplying means to apply the bits appearing in that path to said multiplying means as a new quantity a predetermined time after the last preceding quantity applied thereto, the product of said time and the number of decimal digits in the derived decimal value of any of said initial quantities being smaller than said predetermined minimum interval between any of said initial quantities.

8. A translator for deriving the decimal value of an initial binary quantity having a predetermined number of bits all of which lie on the same side of the binary point, comprising binary multiplying means adapted to produce the binary product of any quantity applied thereto and a multiplier which is a positive integral power of the decimal value ten when the bits of said initial quantity lie on the right side of the binary point and which is a negative integral power of the decimal value ten when the bits of said initial quantity lie on the left side of the binary point, means for applying said initial quantity to said multiplying means, extracting means connected to said multiplying means and having a pair of output paths, said extracting means being adapted to direct those bits of each binary product which lie on the opposite side of the binary point from that of the bits of said initial quantity to the first of said paths and to direct the remaining bits of each such product to the second of said paths, means connected to said first path for storing the digits appearing therein, and delay means for connecting the second of said paths to said multiplying means to apply the bits appearing in that path to said multiplying means as a new quantity a predetermined time after the last preceding quantity applied thereto.

9. A translator for deriving the value in a second number system of an initial binary quantity having a predetermined number of bits, comprising point converting means for producing a converted initial binary quantity by applying to said initial binary quantity a factor which is the binary equivalent of a power of the radix of said second number system such that all bits of said converted initial quantity lie on the same side of the binary point, multiplying means connected to said converting means, said multiplying means being adapted to produce the binary product of any quantity applied thereto and a multiplier which is a positive integral power of the radix of said second number system when the bits of said converted initial quantity lie on the right side of the binary point and which is a negative integral power of the radix of said second number system when the bits of said converted initial quantity lie on the left side of the binary point, extracting means connected to said multiplying means and having a pair of output paths, said extracting means being adapted to direct those bits of each binary product which lie on the opposite side of the binary point from that of the bits of said converted initial quantity to the first of said paths and to direct the remaining bits of each such product to the second of said paths, means connected to said first path for storing the bits appearing therein, and delay means for connecting the second of said paths to said multiplying means to apply the bits appearing in that path to said multiplying means as a new quantity a predetermined time after the last preceding quantity applied thereto.

10. A translator for deriving the value in a second number system of an initial quantity expressed as a predetermined number of digits in a first number system all lying on the same side of the point separating integral and fractional quantities, each digit in said second number system having a significance which is a predetermined multiple of the significance of the immediately preceding digit, comprising multiplying means adapted to produce the product in said first number system of any quantity applied thereto and any selected one of said predetermined multiples, means for applying said initial quantity to said multiplying means, extracting means connected to said multiplying means and having a pair of output paths, said extracting means being adapted to direct those digits of each such product which lie on the opposite side of said point from that of the digits of said initial quantity to the first of said paths and to direct the remaining digits of each such product to the second of said paths, means connected to said first path for storing the digits appearing therein, delay means for connecting the second of said paths to said multiplying means to apply the digits appearing in that path to said multiplying means as a new quantity a predetermined time after the last preceding quantity applied thereto, and timing means connected to said multiplying means, said timing means being adapted to select successive ones of said predetermined multiples synchronously with application of successive quantities to said multiplying means.

11. A translator for deriving the value in a second number system of an initial quantity expressed as a predetermined number of digits in a first number system, each digit in said second number system having a significance which is a predetermined multiple of the significance of the immediately preceding digit, comprising point converting means for producing a converted initial quantity by applying to said initial quantity a factor which is the equivalent in said first number system of a power of the radix of said second number system such that all digits of said converted initial quantity lie on the same side of the point which separates integral and fractional quantities, multiplying means connected to said converting means, said multiplying means being adapted to produce the product in said first number system of any quantity applied thereto and any selected one of said predetermined multiples, extracting means connected to said multiplying means and having a pair of output paths, said extracting means being adapted to direct those digits of each such product which lie on the opposite side of said point from that of the digits in said converted initial quantity to the first of said paths and to direct the remaining digits of each such product to the second of said paths, means connected to said first path for storing the digits appearing therein, delay means for connecting the second of said paths to said multiplying means to apply the digits appearing in that path to said multiplying means as a new quantity a predetermined time after the last preceding quantity applied thereto, and timing means connected to said multiplying means, said timing means being adapted to select successive ones of said predetermined multiples synchronously with application of successive quantities to said multiplying means.

12. A translator for deriving from an initial binary number having a predetermined number of bits all lying on the same side of the binary point its equivalent in a second number system wherein it is expressed as a succession of decimal digits of which each is a predetermined multiple of the immediately preceding digit, comprising multiplying means adapted to produce the binary product of any number applied thereto and any selected one of said predetermined multiples, means for applying said initial binary number to said multiplying means, extracting means connected to said multiplying means and having a pair of output paths, said extracting means being adapted to direct those bits of each of such product which lie on the opposite side of the binary point from that of the bits of said initial number to the first of said paths and to direct the remaining bits of each such product to the second of said paths, means connected to said first path for storing the bits appearing therein, delay means for connecting the second of said paths to said multiplying means to apply the bits appearing in that path to said multiplying means as a new quantity a predetermined time after the last preceding quantity applied thereto, and timing means connected to said multiplying means, said timing means being adapted to select successive ones of said predetermined multiples synchronously with application of successive numbers to said multiplying means.

13. A translator for deriving the value in a second number system of an initial quantity expressed as a predetermined number of digits in a first number system and having a value less than unity, comprising multiplying means adapted to produce the product in said first number system of any quantity applied thereto and a power of the radix of said sceond number system, means for applying said initial quantity to said multiplying means, extracting means connected to said multiplying means and having first and second output paths which may be selectively rendered conductive, delay means for connecting the first of said paths to said multiplying means to apply the digits appearing in that path to said multiplying means as a new quantity a predetermined time after the last preceding quantity applied thereto, a plurality of selectable storage means connected to the second of said output paths, first timing means connected to said extracting means and to said storage means, said first timing means being adapted to select alternate groups of said storage means for successive quantities entering said multiplying means, and second timing means connected to said extracting means, said second timing means being adapted to selectively render the first of said paths of said extracting means conductive for those digits of each product produced by said multiplying means having a value greater than unity and to selectively render the second of said paths conductive for the remaining digits of each such product.

14. A translator for deriving the value in a second number system of an initial quantity expressed as a predetermined number of digits in a first number system all lying on the same side of the point separating integral and fractional quantities, comprising multiplying means adapted to produce the product in said first number system of any quantity applied thereto and a multiplier which is a positive integral power of the radix of said second number system when the digits of said initial quantity lie on the right side of said point and which is a negative integral power of the radix of said first number system when the digits of said input quantity lie on the left side of said point, means for applying said initial quantity to said multiplying means, extracting means connected to said multiplying means and having first and second output paths which may be selectively rendered conductive, timing means connected to said extracting means, said timing means being adapted to selectively render the first of said output paths conductive for those digits of each of said products which lie on the same side of said point as that of the digits of said initial quantity and to render the second path conductive for the remaining digits of each of such products, means connected to said second path for storing the digits conducted thereby, and delay means for connecting the second of said paths to said multiplying means to apply the digits conducted by that path to said multiplying means as a new quantity a predetermined time after the last preceding quantity applied thereto.

15. A translator for deriving from an initial binary number having a predetermined number of bits all lying on the same side of the binary point its equivalent in a second number system wherein it is expressed as a succession of digits of which each is a predetermined multiple of the immediately preceding digit, comprising multiplying means adapted ot produce the binary product of any number applied thereto and any selected one of said predetermined multiples, means for applying said initial number to said multiplying means, extracting means connected to said multiplying means and having a pair of output paths which may be selectively rendered conductive, a plurality of selectable storage means connected to a first of said output paths, delay means for connecting the second of said paths to said multiplying means to apply the bits appearing in that path back to said multiplying means as a new number a predetermined time after the last preceding number applied thereto, first timing means connected to said multiplying means and adapted to select successive ones of said predetermined multiples for successive numbers entering said multiplying means, second timing means connected to said extracting means and adapted to so selectively render said output paths of said extracting means conductive that the bits of each of said products produced by said multiplying means which lie on the opposite side of the binary point from that of the bits of said initial number are conducted by the first of said paths and the remaining bits of each such product are conducted by the second of said paths, and third timing means connected to both said storage means and said multiplying means, said third timing means being adapted to select alternate groups of said storage means for successive numbers entering said multiplying means.

16. A translator for deriving the value in a second number system of an initial quantity comprising a predetermined number of digits in a first number system all lying on the same side of the point separating integral and fractional quantities, each digit in said second number system having a significance which is a predetermined multiple of the significance of the immediately preceding digit, comprising multiplying means adapted to produce the product in said first number system of any quantity applied thereto and any selected one of said predetermined multiples, means for applying said initial quantity to said multiplying means, extracting means connected to said multiplying means and having a pair of output paths which may be selectively rendered conductive, a plurality of selectable storage means connected to the first of said output paths, delay means for connecting the second of said paths to said multiplying means to apply the digits appearing in that path to said multiplying means as a new quantity a predetermined time after the last preceding quantity applied thereto, first timing means connected to said multiplying means and adapted to select successive ones of said predetermined multiples for successive quantities entering said multiplying means, second timing means connected to said extracting means and adapted to so selectively render said output paths of said extracting means conductive that the digits of each of said products produced by said multiplying means which lie on the opposite side of the point in said first number system from that of the digits of said initial quantity are conducted by a first of said paths and the remaining digits of each such product are conducted by the second of said paths, and third timing means connected to said storage means and said multiplying means, said third timing means being adapted to select alternate groups of said storage means for successive quantities entering said multiplying means.

17. A translator for deriving the value in a second number system of an initial quantity less than unity in a first number system and which is represented as a particular permutation of a group of a predetermined number of pulses, comprising multiplying means adapted to produce a product pulse group representing the product in said first number system of the quantity represented by any pulse group applied thereto and the radix of said second number system, means for applying the pulse group representing said initial quantity to said multiplying means, a pair of output paths connected to said multiplying means, pulse timing means connected to said paths, said pulse timing means being adapted to direct those pulses in each such product pulse group which represent a quantity greater than unity to the first of said paths and to direct the remaining pulses in each such product pulse group to the second of said paths, a plurality of storage elements connected to said first path for storing each pulse appearing therein, and pulse delay means for connecting the second of said paths to said multiplying means, said pulse delay means being adapted to apply the pulses appearing in said second path to said multiplying means as a new pulse group a predetermined time after the last preceding pulse group applied thereto.

References Cited in the file of this patent

FOREIGN PATENTS

| | | |
|---|---|---|
| 716,322 | Great Britain | Oct. 6, 1954 |
| 1,118,484 | France | Mar. 19, 1956 |